United States Patent
Shimizu et al.

(10) Patent No.: US 7,916,454 B2
(45) Date of Patent: Mar. 29, 2011

(54) CAPACITOR

(75) Inventors: Toshiaki Shimizu, Nara (JP); Motohiro Sakata, Osaka (JP); Toshiyuki Kitagawa, Kyoto (JP); Kouji Moriyama, Kyoto (JP); Kouji Ueoka, Nara (JP)

(73) Assignee: Panasonic Corporation, Osaka (JP)

( * ) Notice: Subject to any disclaimer, the term of this patent is extended or adjusted under 35 U.S.C. 154(b) by 472 days.

(21) Appl. No.: 12/067,881

(22) PCT Filed: Oct. 3, 2007

(86) PCT No.: PCT/JP2007/069339
§ 371 (c)(1),
(2), (4) Date: Mar. 24, 2008

(87) PCT Pub. No.: WO2008/047597
PCT Pub. Date: Apr. 24, 2008

(65) Prior Publication Data
US 2010/0149728 A1      Jun. 17, 2010

(30) Foreign Application Priority Data

Oct. 16, 2006  (JP) .................................. 2006-281089
Feb. 14, 2007  (JP) .................................. 2007-033182

(51) Int. Cl.
*H01G 9/12* (2006.01)
*H01G 2/12* (2006.01)

(52) U.S. Cl. ....................................... 361/521; 361/519

(58) Field of Classification Search .................. 361/521, 361/517–520, 535–538
See application file for complete search history.

(56) References Cited

U.S. PATENT DOCUMENTS 6,310,756  B1   10/2001   Miura et al.

FOREIGN PATENT DOCUMENTS

| JP | 2000-195761 | 7/2000 |
| JP | 2000-315632 | 11/2000 |
| JP | 2000-335649 | 12/2000 |
| JP | 2003-100571 | 4/2003 |
| JP | 2004-134632 | 4/2004 |
| JP | 2005-183754 | 7/2005 |

OTHER PUBLICATIONS

International Search Report issued Dec. 25, 2007 in the International (PCT) Application of which the present application is the U.S. National Stage.
Partial English translation of JP 2000-195761, Jul. 2000.

*Primary Examiner* — Eric Thomas
(74) *Attorney, Agent, or Firm* — Wenderoth, Lind & Ponack, LLP.

(57) ABSTRACT

A pressure control valve provided on a terminal plate of a capacitor includes a filter, a valve body and a cap. The filter is provided so as to close a through-hole disposed in a terminal plate and is composed of a gas permeable sheet preventing permeation of the electrolyte solution. The valve body is formed of an elastic material, has a cylindrical part and a bottom part, and is disposed so that the bottom part covers the through-hole of the terminal plate. The cap is fixed to the terminal plate, covers the valve body, and holds the valve body in a composed state with respect to the terminal plate. The cap is provided with a vent hole. The valve body and the filter are spaced apart from each other.

17 Claims, 8 Drawing Sheets

FIG. 8 - PRIOR ART
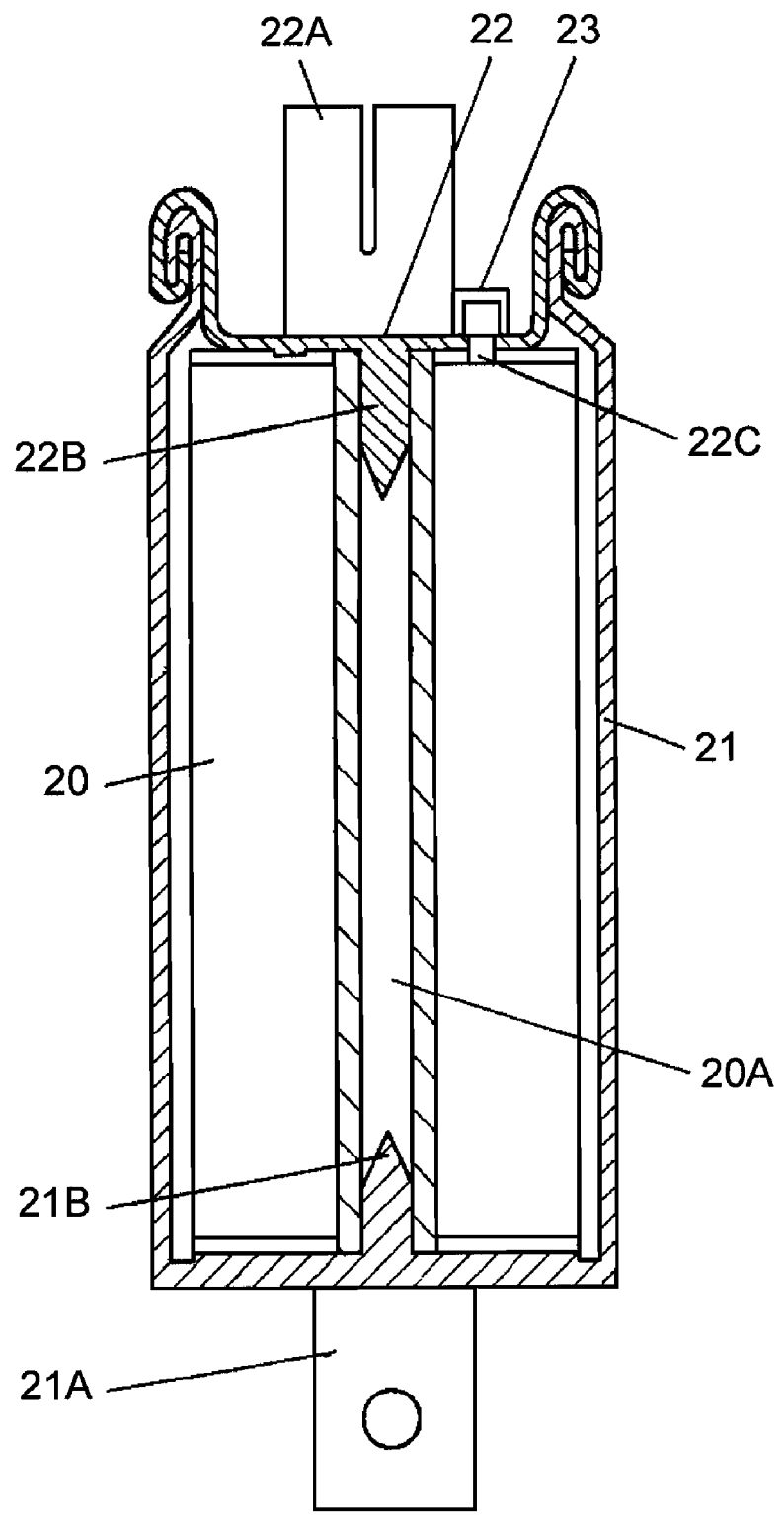

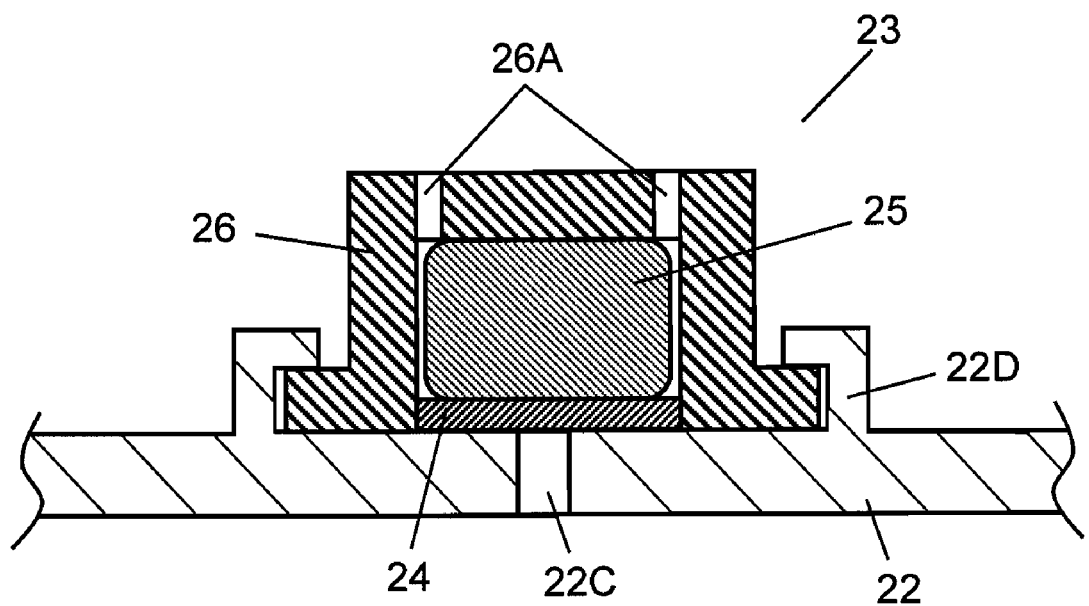
FIG. 9 - PRIOR ART

CAPACITOR

This application is a U.S. national phase application of PCT International Application PCT/JP2007/069339, filed Oct. 3, 2007.

BACKGROUND OF THE INVENTION

1. Technical Field

The present invention relates to a capacitor that has a pressure control valve with a stable operating pressure and that is excellent in safety.

2. Background Art

FIG. 8 is a sectional view showing a conventional capacitor, and FIG. 9 is a sectional view showing a configuration of pressure control valve 23 provided in the capacitor. This capacitor includes capacitor element 20 provided with hollow 20A. Capacitor element 20 includes a pair of positive and negative electrodes, each in which a polarizable electrode layer is formed on an aluminum foil current collector, and a separator interposed therebetween (these are not shown). The positive and negative electrodes are wound in such a manner that they are displaced from each other in the opposite direction (in the vertical direction in FIG. 8). From both ends (upper and lower ends in FIG. 8) of capacitor element 20, positive and negative electrodes are electrically led out, respectively.

Case 21, which has a cylindrical shape with a bottom and is made of a metal such as aluminum, accommodates capacitor element 20 together with an electrolyte solution (not shown). Negative terminal 21A for external connection is provided integrally with the outer bottom surface of case 21. Protrusion 21B is provided integrally with the inner bottom surface of case 21 so that it is fitted into hollow 20A. After protrusion 21B is fitted into hollow 20A, the end on the side of the negative electrode of capacitor element 20 that has been inserted into case 21 is bonded to the inner bottom surface of case 21 mechanically and electrically by, for example, laser welding.

Positive terminal 22A for external connection is provided integrally with the outer surface side of aluminum sealing plate 22. Protrusion 22B is fitted into hollow 20A. Hole 22C is provided in order to pour the electrolyte solution into case 21. Pressure control valve 23 is provided so as to close hole 22C. The end on the side of the positive electrode of capacitor element 20 is bonded to the inner surface of sealing plate 22 mechanically and electrically by, for example, laser welding. Furthermore, case 21 is sealed by performing a process (curling process) so that the peripheral edge of sealing plate 22 wraps the opening portion of case 21.

As shown in FIG. 9, pressure control valve 23 includes gas permeable member 24, blocking body 25 and metal cap 26. Gas permeable member 24 and blocking body 25 are disposed on hole 22C. Metal cap 26 is provided with hole 26A that communicates with the outside. Cap 26 is fixed so as to cover them and presses blocking body 25 in the direction in which blocking body 25 always blocks hole 22C. Annular convex part 22D is provided on sealing plate 22 so that it surrounds the periphery of hole 22C. Cap 26 is fixed by deforming convex part 22D by, for example, caulking and pressing it to cap 26.

Pressure control valve 23 releases a gas generated inside the capacitor to the outside when the internal pressure of the capacitor is a predetermined pressure or more. Thus, the pressure inside the capacitor is prevented from increasing. Furthermore, after operation, pressure control valve 23 returns to its pre-operation state so as to maintain the airtightness inside the capacitor. That is to say, pressure control valve 23 is a self-returning type valve. Therefore, even if the internal pressure is increased due to the generation of gas inside the capacitor, the appearance of the capacitor is not affected, and the property can be maintained.

Furthermore, pressure control valve 23 includes gas permeable member 24. Gas permeable member 24 is formed of a material capable of preventing permeation of the electrolyte solution and allowing a gas generated inside the capacitor to permeate to the outside. By bringing gas permeable member 24 into close contact with the periphery of hole 22C of sealing plate 22, it is possible to prevent the function of pressure control valve 23 from being impaired due to contact of the electrolyte solution with blocking body 25. Furthermore, it is possible to prevent the electrolyte solution from leaking to the outside of the capacitor via pressure control valve 23. Such a capacitor is disclosed in, for example, Japanese Patent Application Unexamined Publication No. 2004-134632.

Thus, in a conventional capacitor, pressure control valve 23 is placed with respect to hole 22C for pouring an electrolyte solution into the case. Thus, it is possible to prevent leakage of an electrolyte solution. However, pressure control valve 23 is placed by directly incorporating each member on hole 22C after a capacitor is fabricated and an electrolyte solution is poured through hole 22C. Therefore, a variation in the fabrication accuracy of pressure control valve 23 leads to a variation in the operation of pressure control valve 23. In particular, since an amount of compression of blocking body 25 is directly linked to an operating pressure of pressure control valve 23, the variation in the operating pressure of pressure control valve 23 easily occurs.

SUMMARY OF THE INVENTION

The present invention provides a capacitor having a pressure control valve with a stable operating pressure. The capacitor of the present invention includes a capacitor element, an electrolyte solution, a case, a terminal plate, a filter, a valve body and a cap. The capacitor element includes a positive electrode, a negative electrode facing the positive electrode, and a separator interposed between the positive and negative electrodes. The capacitor element is impregnated with the electrolyte solution. The case has an opening and accommodates the capacitor element and the electrolyte solution. The terminal plate provided with a first hole seals the opening of the case. The filter is provided so as to close the first hole and is composed of a gas permeable sheet capable of preventing permeation of an electrolyte solution. The valve body formed of an elastic material has a cylindrical part and a bottom part, and is disposed so that the bottom part covers the filter. The cap provided with a second hole is fixed to the terminal plate, covers the valve body, and holds the valve body in a state in which it compresses the valve body with respect to the terminal plate. The valve body and the filter are provided apart from each other. The filter, the valve body, and the cap constitute a pressure control valve. The capacitor employing this pressure control valve has a constant operating pressure in a wide range of compression ratios and is capable of repeating operations. Therefore, the capacitor having this pressure control valve has improved reliability and safety.

BRIEF DESCRIPTION OF THE DRAWINGS

FIG. 8 is a sectional view showing a conventional capacitor.

FIG. 9 is a sectional view showing a pressure control valve of the conventional capacitor.

DETAILED DESCRIPTION OF THE PREFERRED EMBODIMENTS

First Exemplary Embodiment

Figure 1:
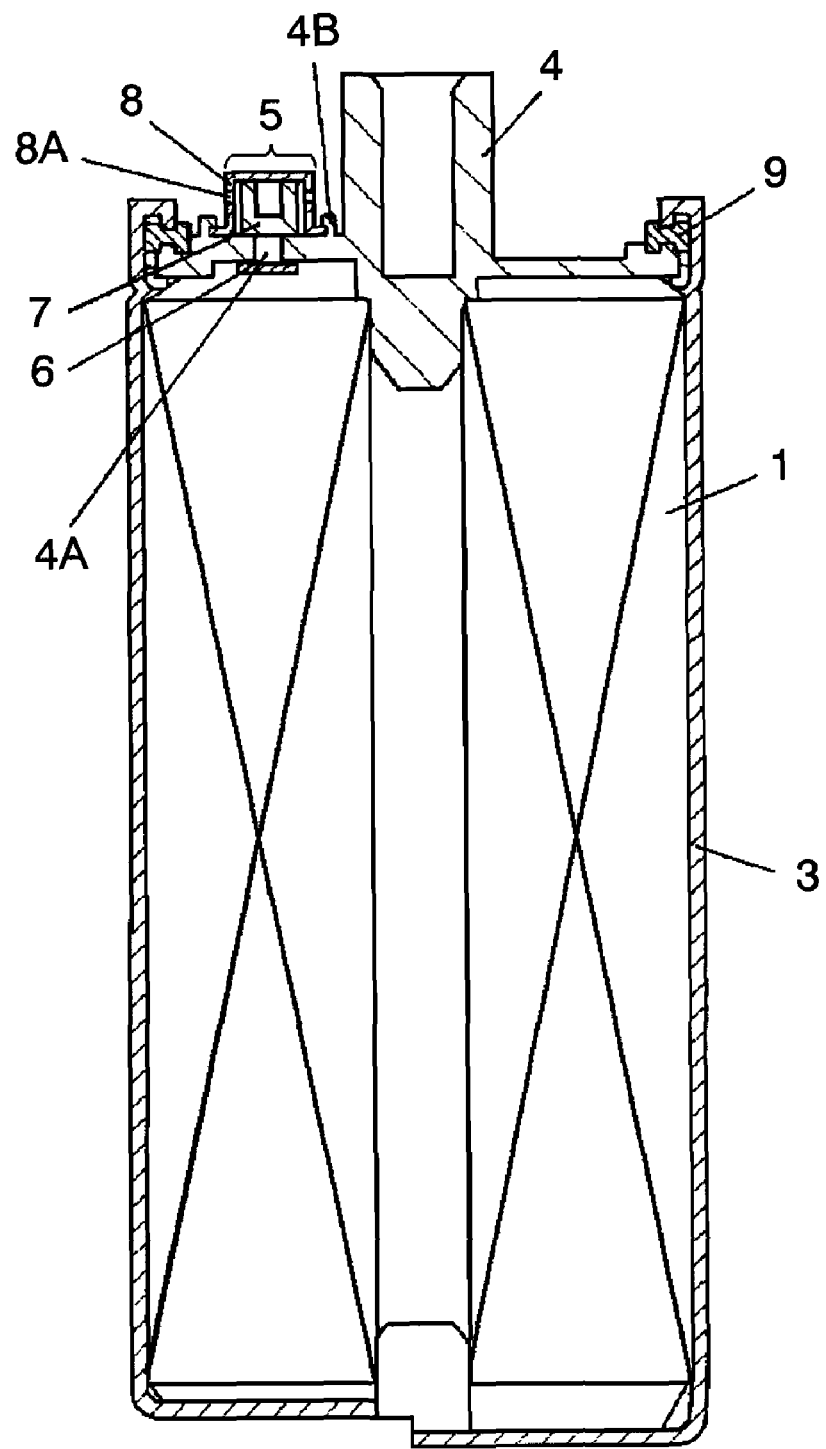
FIG. 1 is a sectional view showing a capacitor in accordance with a first exemplary embodiment of the present invention.

FIG. 1 is a sectional view showing a capacitor in accordance with a first exemplary embodiment of the present invention. This capacitor includes capacitor element 1, metal case 3, terminal plate 4 and pressure control valve 5.

Capacitor element 1 includes a pair of positive and negative electrodes, each in which a polarizable electrode layer is formed on an aluminum foil current collector, and a separator interposed therebetween (these are not shown). The positive and negative electrodes are wound in such a manner that they are displaced from each other in the opposite direction (in the vertical direction in FIG. 1). From both ends (upper and lower ends in FIG. 1) of capacitor element 1, the positive and negative electrodes are electrically led out, respectively.

Case 3, which has a cylindrical shape with a bottom and is made of a metal such as aluminum, accommodates capacitor element 1 together with an electrolyte solution (not shown). Capacitor element 1 is impregnated with the electrolyte solution. The end on the negative electrode side of capacitor element 1 that has been inserted into case 3 is bonded to the inner bottom surface of case 3 mechanically and electrically by, for example, laser welding. According to this configuration, case 3 also serves as a lead-out electrode on the side of the negative electrode of capacitor element 1.

Terminal plate 4 made of metal such as aluminum is provided with through-hole 4A as a first hole used for pouring an electrolyte solution into case 3. The end on the side of the positive electrode of capacitor element 1 is bonded to the inner surface of terminal plate 4 mechanically and electrically by, for example, laser welding. Case 3 is sealed by performing a process such as curling so that the peripheral edge of terminal plate 4 is wrapped with an opening of case 3 with insulating member 9 intervening in the peripheral edge of terminal plate 4 and the opening of case 3. That is to say, terminal plate 4 seals the opening of case 3. Terminal plate 4 serves as a lead-out electrode on the side of the positive electrode.

Pressure control valve 5 is provided on through-hole 4A of the thus configured terminal plate 4. When a gas is generated due to a reaction of the electrolyte solution and the like, and the internal pressure is abnormally increased, the pressure can be released via pressure control valve 5.

Figure 2:
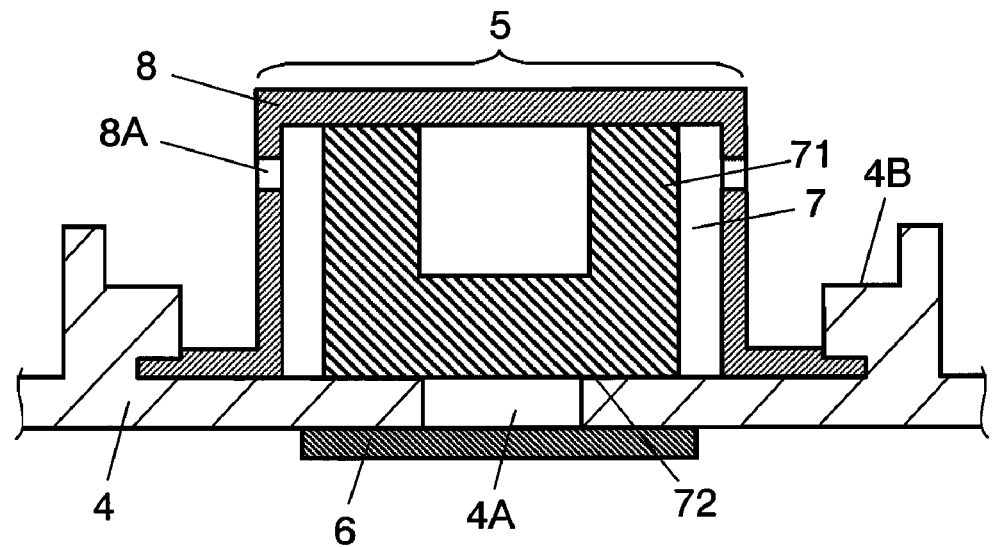
FIG. 2 is a sectional view showing a pressure control valve of the capacitor in accordance with the first exemplary embodiment of the present invention.
Figure 3:
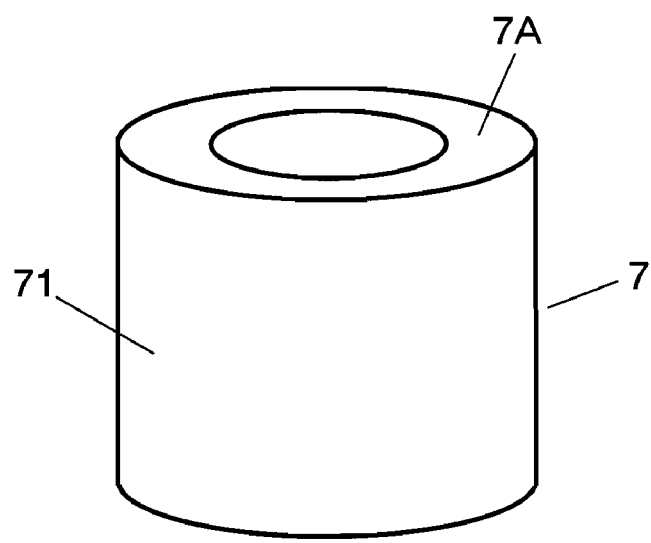
FIG. 3 is a perspective view of a valve body in the pressure control valve shown in FIG. 2.

FIG. 2 is a sectional view showing pressure control valve 5, and FIG. 3 is a perspective view showing valve body 7. Pressure control valve 5 includes filter 6, valve body 7 and cap 8.

Filter 6 is composed of a gas permeable sheet. Filter 6 has a property of allowing a gas generated under terminal plate 4 to permeate while preventing permeation of the electrolyte solution. As such a sheet, for example, a porous film of polytetrafluoroethylene can be used. Filter 6 is fixed to the lower surface of terminal plate 4 with an adhesive agent and the like beneath through-hole 4A provided in terminal plate 4 (inner side of case 3). Alternatively, filter 6 may be fixed by disposing denatured polypropylene (not shown) between filter 6 and terminal plate 4 and performing heat-sealing thereof.

Valve body 7 formed of an elastic material such as butyl rubber is disposed so that its central axis is substantially identical to the central axis of through-hole 4A. Metal cap 8 is provided with vent holes 8A as second holes that communicates to the outside. Valve body 7 is disposed so as to close through-hole 4A. That is to say, valve body 7 is provided so as to cover through hole 4A and be spaced apart from filter 6. Cap 8 is made of a metal such as stainless steel, covers valve body 7, and holds valve body 7 in a state in which it compresses valve body 7. Cap 8 is fixed by convex part 4B provided on terminal plate 4.

In such a configuration, when the internal pressure of case 3 shown in FIG. 1 is abnormally increased, valve body 7 is pushed upward and only the gas passes through filter 6 and through-hole 4A and is released from vent holes 8A to the outside. Therefore, the pressure can be released via pressure control valve 5 without leakage of the electrolyte solution accommodated in case 3.

In this configuration, valve body 7 and filter 6 are spaced apart from each other. Metal terminal plate 4 is more rigid and has higher dimensional accuracy as compared with filter 6. Therefore, a variation in the amount of compression of valve body 7 is reduced and a variation in the operating pressure of pressure control valve 5 is also reduced. Thus, a capacitor having a higher safety and in which leakage of the electrolyte solution does not occur even if the pressure is abnormally increased inside case 3 can be produced stably.

Furthermore, valve body 7 has a cylindrical shape with a bottom, and includes cylindrical part 71 and bottom part 72 as shown in FIGS. 2 and 3. Valve body 7 is disposed so that bottom part 72 covers filter 6. Valve body 7 closes through-hole 4A in a form in which cylindrical part 71 is slightly buckling because valve body 7 is pressed by cap 8. Upper surface part 7A of valve body 7 is substantially in parallel to the bottom surface. When valve body 7 is pressed and buckling, even if the amount of compression is somewhat changed, the stress in the vertical direction is not changed. Therefore, the operating pressure of pressure control valve 5 is also stabilized.

Figure 4A:
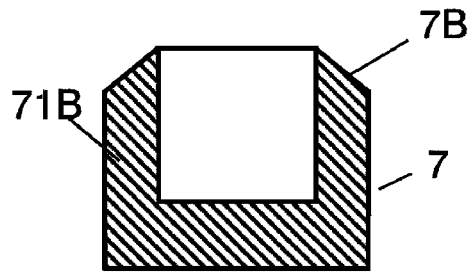
FIG. 4A is a sectional view of another valve body in the pressure control valve in accordance with the first exemplary embodiment of the present invention.
Figure 4B:
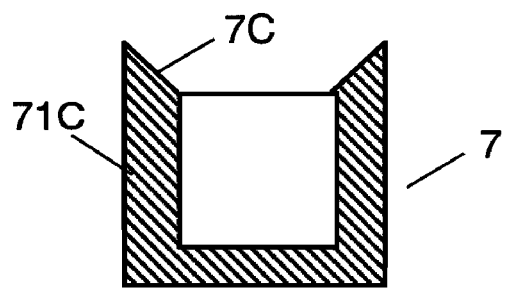
FIG. 4B is a sectional view of still another valve body in the pressure control valve in accordance with the first exemplary embodiment of the present invention.
Figure 4C:
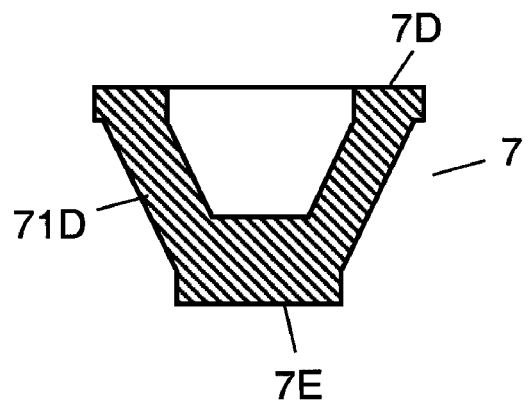
FIG. 4C is a sectional view of yet another valve body in the pressure control valve in accordance with the first exemplary embodiment of the present invention.

Next, more preferable shapes of valve body 7 are described. FIGS. 4A through 4C are sectional views showing more preferable shapes of valve body 7.

Cylindrical part 71B of valve body 7 shown in FIG. 4A has upper surface part 7B arranged to be brought into contact with cap 8. Upper surface part 7B has a so-called taper shape in which the height is gradually reduced from the center to the outer side of cylindrical part 71B. Thus, when valve body 7 is pressed from the upper surface side by cap 8, the wall surface of valve body 7 induces buckling inward.

Furthermore, cylindrical part 71C of valve body 7 shown in FIG. 4B has upper surface part 7C arranged to be brought into contact with cap 8. Upper surface part 7C has a taper shape in which the height is gradually increased from the center to the outer side of the cylinder, contrarily to FIG. 4A. Thus, when valve body 7 is pressed from the upper surface side by cap 8, the wall surface of valve body 7 induces buckling outward.

Furthermore, cylindrical part 71D of valve body 7 shown in FIG. 4C has upper surface part 7D arranged to be brought into contact with cap 8. The diameter of bottom part 7E is smaller than the diameter (outer diameter) of upper surface part 7D. Cylindrical part 71D is formed in a mortar shape. Thus, the wall surface of valve body 7 buckles in such a manner that it bends downward.

By using any of these valve bodies 7, it is possible to control the buckling state of valve body 7. That is to say, even if the amount of compression of valve body 7 is somewhat changed, the stress in the vertical direction can be better stabilized. Consequently, it is possible to stabilize the operating pressure of pressure control valve 5.

Second Exemplary Embodiment

Figure 5:
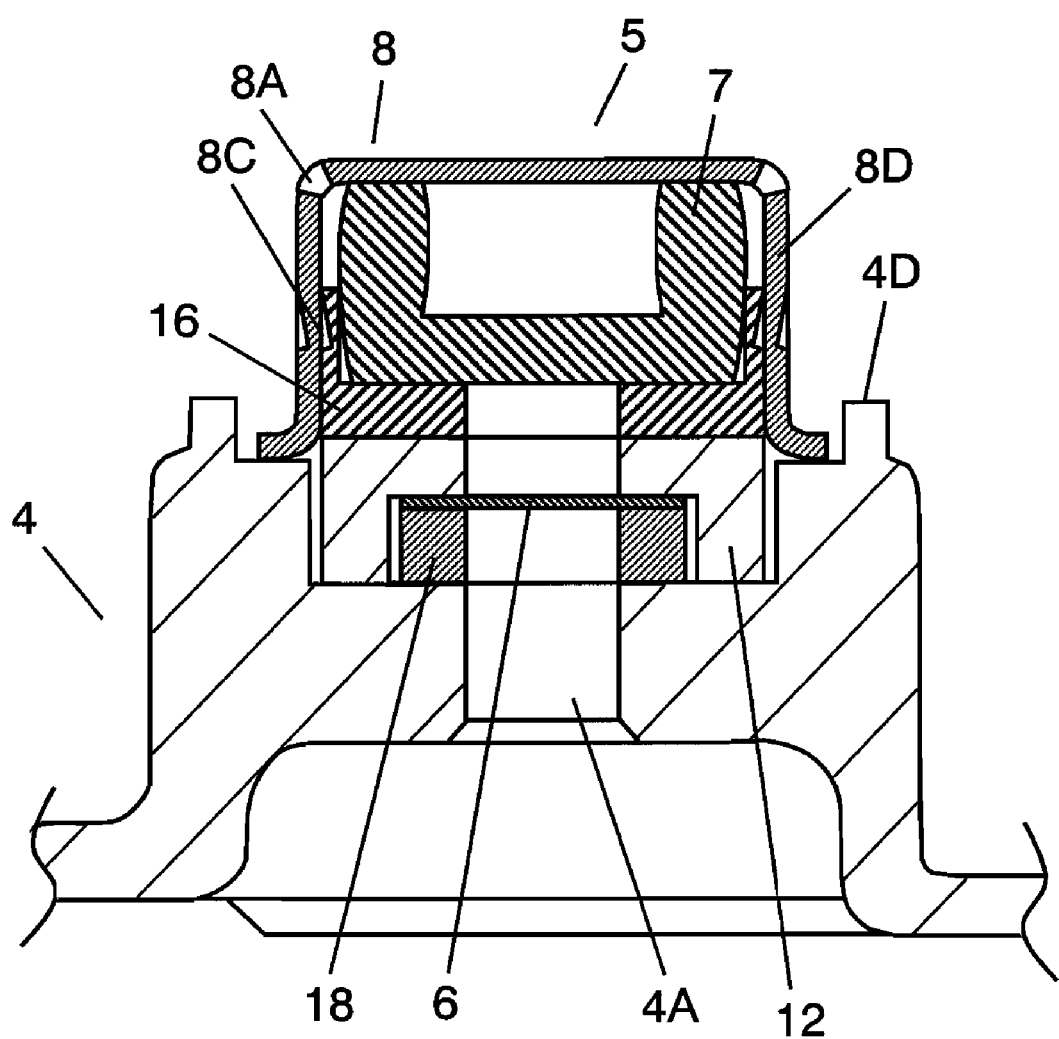
FIG. 5 is a sectional view showing a pressure control valve used in a capacitor in accordance with a second exemplary embodiment of the present invention.
Figure 6:
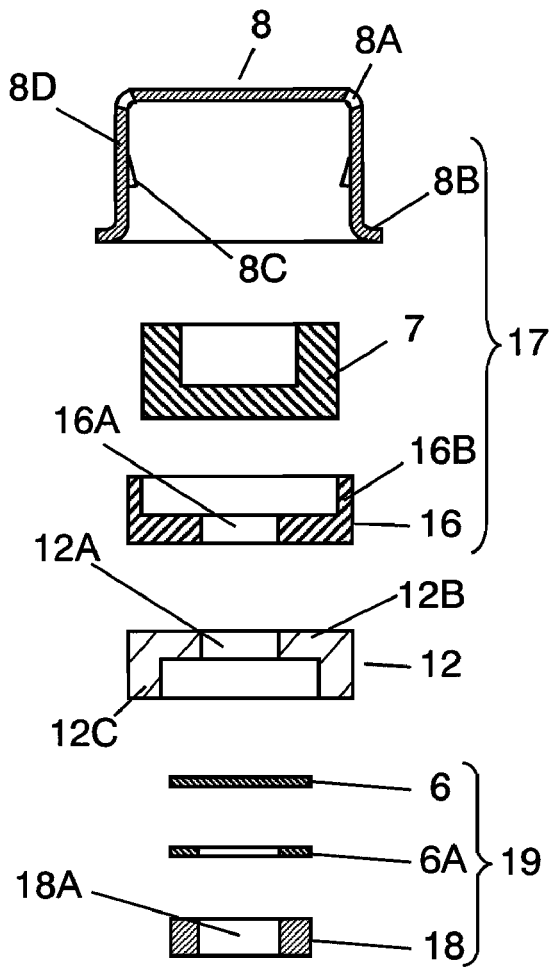
FIG. 6 is an exploded sectional view of the pressure control valve shown in FIG. 5.
Figure 6:
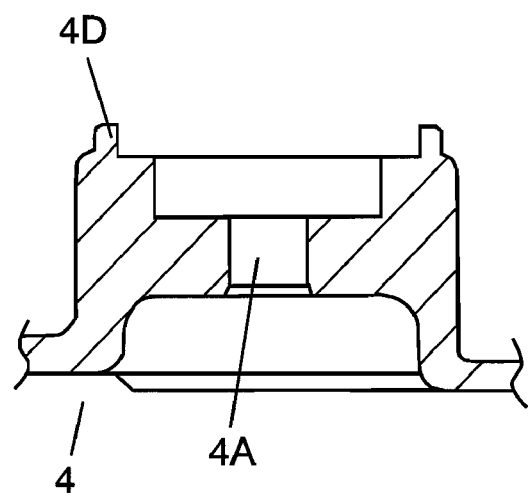

FIG. 5 is a sectional view showing a pressure control valve used in a capacitor in accordance with a second exemplary embodiment of the present invention. FIG. 6 is an exploded sectional view of the pressure control valve shown in FIG. 5. The capacitor of this exemplary embodiment includes terminal plate 4 and pressure control valve 5 having a different structure than pressure control valve 5 of the first exemplary embodiment. Since the other basic configurations are the same as those of the first exemplary embodiment, only pressure control valve 5 and terminal plate 4 are described and the description of the other components is omitted herein. Note that the same reference numerals are given to the components having the same configuration as those in the first exemplary embodiment and the detailed description thereof may be omitted.

Pressure control valve 5 of this exemplary embodiment includes valve unit 17, filter unit 19 and presser rubber 12. Firstly, valve unit 17 is described. Valve unit 17 includes valve body 7, cap 8 and washer 16 as a first washer.

Valve body 7 is composed of butyl rubber and formed in a cylindrical shape with a bottom as in the first exemplary embodiment. Flange 8B is provided at an opening end of cap 8 having a cylindrical shape with a bottom. Washer 16 is formed of aluminum and provided with hole 16A at the center thereof. In addition, annular wall part 16B is provided integrally with the peripheral edge of the upper surface of washer 16.

Valve unit 17 is fabricated by mounting valve body 7 on washer 16 and press-fitting washer 16 into cap 8. At this time, valve body 7 is held in a compressed state. Note here that in order to press fit washer 16 into cap 8, a jig (not shown) is used. Thus, it is possible to manage the press-fitting dimension accurately. Furthermore, valve body 7 can be positioned with respect to cap 8 accurately by providing washer 16 with wall part 16B.

Note here that it is preferable that at least a part of cylindrical part 8D of cap 8 is provided with a notch and that this notch is processed to protrude to the inside of cap 8 so as to provide cut-and-raised part 8C. By providing cut-and-raised part 8C, when washer 16 is press-fitted into cap 8, cut-and-raised part 8C provided in stainless steel cap 8 is engaged in aluminum washer 16. Thus, the binding strength of press-fitting is further enhanced.

Next, filter unit 19 is described. Circular filter unit 19 includes filter 6, adhesive agent 6A and washer 18 as a second washer.

Aluminum washer 18 is provided with hole 18A in the center thereof. Filter 6 is formed of the same material as that of the first exemplary embodiment. Adhesive agent 6A is also formed of, for example, film-like denatured polypropylene (hereinafter, referred to as "denatured PP") as described in the first exemplary embodiment. Filter 6 and washer 18 are bonded to each other by heat-sealing with the use of adhesive agent 6A. Filter unit 19 is disposed on through-hole 4A provided in terminal plate 4 for pouring an electrolyte solution therethrough.

Figure 7:
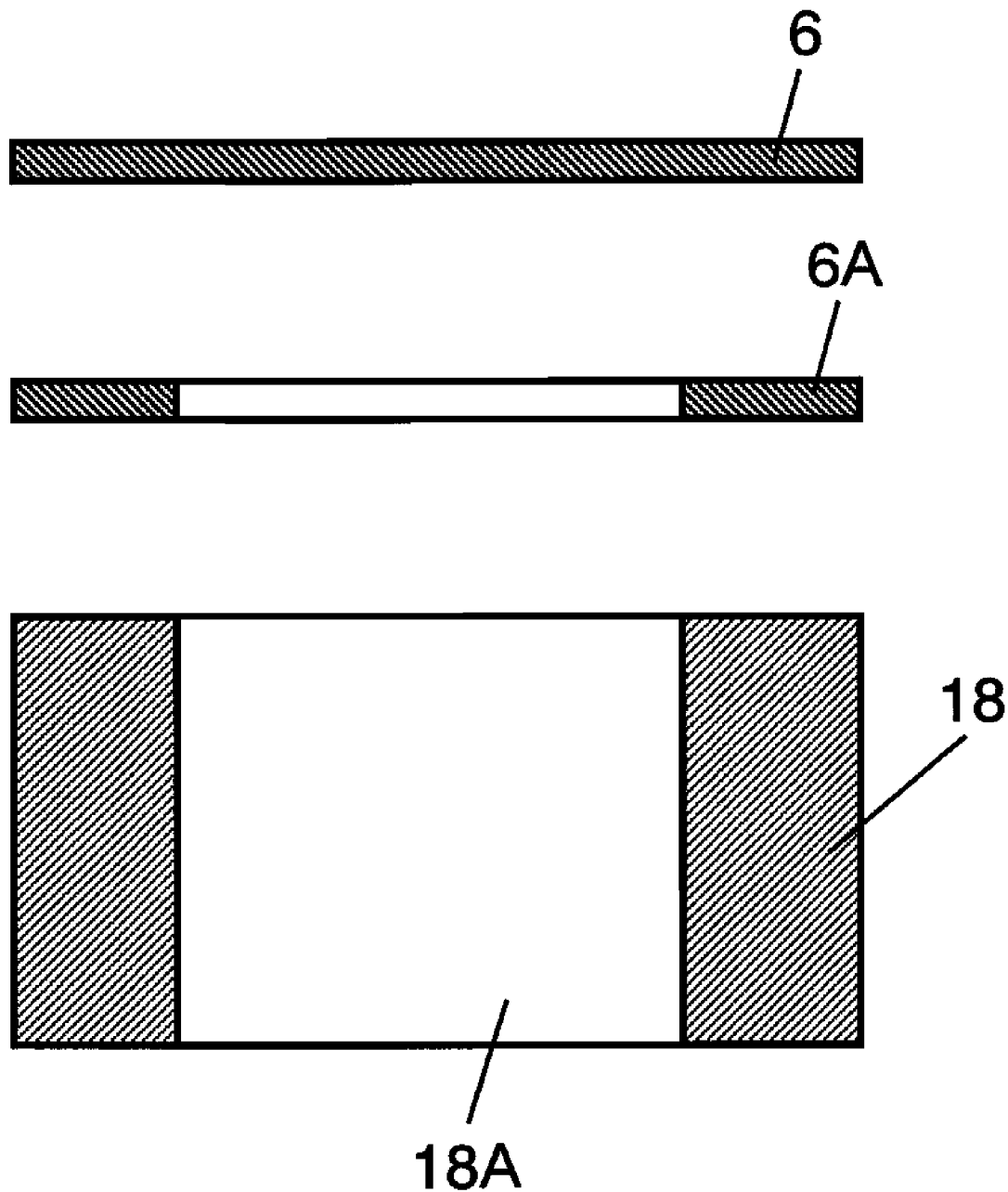
FIG. 7 is an exploded sectional view of a filter unit in the pressure control valve shown in FIG. 5.

FIG. 7 is an exploded sectional view of filter unit 19, which shows a method of bonding washer 18 and filter 6 to each other by using adhesive agent 6A composed of denatured PP.

Firstly, washer 18 and filter 6 are superimposed on each other with adhesive agent 6A disposed therebetween, followed by heating at 140 to 200° C. for about 10 seconds and press-working at a pressure of 1 kgf/cm². Thus, fused adhesive agent 6A is uniformly impregnated into filter 6 to generate an anchor effect by which filter 6 and washer 18 are bonded to each other.

Cylindrical presser rubber 12 made of butyl rubber includes flat part 12B provided with hole 12A in the center thereof and wall part 12C made in the peripheral part of flat part 12B.

A procedure for fabricating pressure control valve 5 on terminal plate 4 by using the thus configured valve unit 17, filter unit 19 and presser rubber 12 is described. Firstly, filter unit 19 is disposed on the upper side (outer side) of through-hole 4A provided in terminal plate 4. Then, presser rubber 12 is put so as to cover filter unit 19. At this time, presser rubber 12 is disposed so that wall part 12C surrounds filter unit 19. Furthermore, valve unit 17 is disposed on presser rubber 12. Then, by caulking protrusion 4D provided on terminal plate 4, protrusion 4D is press-contacted to flange 8B of cap 8. Thus, cap 8 and terminal plate 4 are mechanically coupled to each other. At this time, caulking is carried out so that presser rubber 12 is held in a compressed state. Thus, presser rubber 12 is brought into close contact with the lower surface of washer 16 and presses filter 6 bonded to filter unit 19. Thus, in pressure control valve 5 of this exemplary embodiment, valve body 7 is incorporated into valve unit 17 and filter 6 is incorporated into filter unit 19, respectively.

By press-fitting washer 16 into cap 8 on which valve body 7 is disposed, valve unit 17 in which valve body 7 is held in a compressed state is fabricated. Therefore, the fabrication accuracy of valve unit 17 is improved and a variation in an amount of compression of valve body 7 is reduced. That is to say, also in pressure control valve 5 of this exemplary embodiment, valve body 7 and filter 6 are spaced apart from each other. Furthermore, by using valve body 7 having a cylindrical shape with a bottom, the same effect as that in the first exemplary embodiment can be obtained. Thus, a variation in the operation of pressure control valve 5 is reduced. Furthermore, the operation of pressure control valve 5 can be checked by checking valve unit 17 alone. Note here that it is preferable that any of valve bodies 7 shown in FIGS. 4A to 4C is used because the same effect as in the first exemplary embodiment can be obtained.

In the first and second exemplary embodiments, case 3 and terminal plate 4 serve as lead-out electrodes of the electrodes of capacitor element 1, respectively. Besides, lead-out electrodes may be provided by using lead wires and the like from capacitor element 1.

Furthermore, it is preferable that valve body 7 is formed of ethylene propylene rubber because oil resistance, chemical resistance, and the like, are improved. Furthermore, it is also preferable that valve body 7 is formed of isoprene isobutylene rubber because water resistance is also improved in addition to the above-mentioned effects.

In a capacitor using a pressure control valve of the present invention, a variation in the operating pressure of the pressure control valve is reduced, and therefore the reliability of the operating pressure is improved. As a result, the reliability of the capacitor using the pressure control valve is also improved. Such a capacitor is useful for various electronic equipment, for an automobile system requiring a high reliability under a large current such as regeneration in hybrid cars, and for storing electric power.

The invention claimed is:

1. A capacitor comprising:
   a capacitor element including a positive electrode, a negative electrode facing the positive electrode, and a separator interposed between the positive electrode and the negative electrode;
   an electrolyte solution impregnated in the capacitor element;
   a case accommodating the capacitor element and the electrolyte solution and having an opening;
   a terminal plate provided with a first hole and sealing the opening of the case;
   a filter provided so as to close the first hole and composed of a gas permeable sheet capable of preventing permeation of the electrolyte solution;
   a valve body having a hollow cylindrical part and a bottom part, being disposed so that the bottom part covers the first hole, and being formed of an elastic material; and
   a cap fixed to the terminal plate, covering and holding the valve body in a state in which the cylindrical part of the valve body is deformed so as to buckle, the cap having a second hole;
   wherein the valve body and the filter are spaced apart from each other.

2. The capacitor according to claim 1,
   wherein the filter is fixed to the terminal plate on an inner side of the case, and
   the valve body is brought into direct contact with the terminal plate at the first hole.

3. The capacitor according to claim 2,
   wherein the terminal plate and the filter are bonded to each other with a heat-sealed denatured polypropylene.

4. The capacitor according to claim 1,
   wherein the cylindrical part of the valve body has a tapered surface, in which a height is gradually reduced or increased from a center to an outer side of the cylindrical part, in a part that is brought into contact with the cap.

5. The capacitor according to claim 1,
   wherein a diameter of the bottom part of the valve body is smaller than a diameter of a part that is brought into contact with the cap of the cylindrical part.

6. The capacitor according to claim 1,
   wherein the valve body is formed of one of ethylene propylene rubber and isoprene isobutylene rubber.

7. The capacitor according to claim 1, further comprising:
   a first ring-shaped washer press-fitted into an opening of the cap and holding the valve body together with the cap in a composed state, and
   a second ring-shaped washer to which the filter is bonded;
   wherein the cap, the valve body and the first washer constitute a valve unit, and the filter and the second washer constitute a filter unit disposed so as to close the first hole on an outer side of the case, and
   the capacitor further comprises a presser rubber covering the filter unit on the filter and compressed and held between the filter unit and the first washer.

8. The capacitor according to claim 7, wherein an annular wall part is provided on a peripheral edge on an upper surface of the first washer.

9. The capacitor according to claim 7, wherein the cap has a cylindrical part and at least a part of the cylindrical part is provided with a cut-and-raised part protruding to an inner side of the cap.

10. The capacitor according to claim 7,
    wherein the second washer and the filter are bonded to each other with a heat-sealed denatured polypropylene.

11. The capacitor according to claim 1,
    wherein the filter is a porous film of polytetrafluoroethylene.

12. A capacitor comprising:
    a capacitor element including a positive electrode, a negative electrode facing the positive electrode, and a separator interposed between the positive electrode and the negative electrode;
    an electrolyte solution impregnated in the capacitor element;
    a case accommodating the capacitor element and the electrolyte solution and having an opening;
    a terminal plate provided with a first hole and sealing the opening of the case;
    a filter provided so as to close the first hole and composed of a gas permeable sheet capable of preventing permeation of the electrolyte solution;
    a valve body having a cylindrical part and a bottom part, being disposed so that the bottom part covers the first hole, and being formed of an elastic material; and
    a cap fixed to the terminal plate, covering the valve body, and holding the valve body in a state in which the valve body is compressed with respect to the terminal plate, the cap having a second hole;
    wherein the valve body and the filter are spaced apart from each other; and
    wherein the cylindrical part of the valve body has a tapered surface, in which a height is gradually reduced or increased from a center to an outer side of the cylindrical part, in a part that is brought into contact with the cap.

13. A capacitor comprising:
    a capacitor element including a positive electrode, a negative electrode facing the positive electrode, and a separator interposed between the positive electrode and the negative electrode;
    an electrolyte solution impregnated in the capacitor element;
    a case accommodating the capacitor element and the electrolyte solution and having an opening;
    a terminal plate provided with a first hole and sealing the opening of the case;
    a filter provided so as to close the first hole and composed of a gas permeable sheet capable of preventing permeation of the electrolyte solution;
    a valve body having a cylindrical part and a bottom part, being disposed so that the bottom part covers the first hole, and being formed of an elastic material; and
    a cap fixed to the terminal plate, covering the valve body, and holding the valve body in a state in which the valve body is compressed with respect to the terminal plate, the cap having a second hole;

wherein the valve body and the filter are spaced apart from each other; and wherein a diameter of the bottom part of the valve body is smaller than a diameter of a part that is brought into contact with the cap of the cylindrical part.

14. A capacitor comprising:

a capacitor element including a positive electrode, a negative electrode facing the positive electrode, and a separator interposed between the positive electrode and the negative electrode;

an electrolyte solution impregnated in the capacitor element;

a case accommodating the capacitor element and the electrolyte solution and having an opening;

a terminal plate provided with a first hole and sealing the opening of the case;

a filter provided so as to close the first hole and composed of a gas permeable sheet capable of preventing permeation of the electrolyte solution;

a valve body having a cylindrical part and a bottom part, being disposed so that the bottom part covers the first hole, and being formed of an elastic material; and a cap fixed to the terminal plate, covering the valve body, and holding the valve body in a state in which the valve body is compressed with respect to the terminal plate, the cap having a second hole;

a first ring-shaped washer press-fitted into an opening of the cap and holding the valve body together with the cap in a composed state; and a second ring-shaped washer to which the filter is bonded;

wherein the valve body and the filter are spaced apart from each other;

wherein the cap, the valve body and the first washer constitute a valve unit, and the filter and the second washer constitute a filter unit disposed so as to close the first hole on an outer side of the case; and wherein the capacitor further comprises a presser rubber covering the filter unit on the filter and compressed and held between the filter unit and the first washer.

15. The capacitor according to claim 14, wherein an annular wall part is provided on a peripheral edge on an upper surface of the first washer.

16. The capacitor according to claim 14, wherein the cap has a cylindrical part and at least a part of the cylindrical part is provided with a cut-and-raised part protruding to an inner side of the cap.

17. The capacitor according to claim 14, wherein the second washer and the filter are bonded to each other with a heat-sealed denatured polypropylene.

\* \* \* \* \*